United States Patent [19]

Murase et al.

[11] Patent Number: 5,283,673
[45] Date of Patent: Feb. 1, 1994

[54] SURFACE LUMINOUS SOURCE PANEL WITH AREAS HAVING DIFFERENT REFLECTOR SPECK DENSITIES

[75] Inventors: Shinzo Murase; Hirokazu Matsui, both of Ohtsu, Japan

[73] Assignee: Kabushiki Kaisha Meitaku Shisutemu, Ohtsu, Japan

[21] Appl. No.: 756,260

[22] Filed: Sep. 4, 1991

Related U.S. Application Data

[63] Continuation-in-part of Ser. No. 587,763, Sep. 26, 1990, abandoned.

[30] Foreign Application Priority Data

Sep. 30, 1989 [JP] Japan .................. 1-256820

[51] Int. Cl.$^5$ .............. G02F 1/1335; F21V 7/04
[52] U.S. Cl. .......................... 359/49; 362/31
[58] Field of Search ............... 362/31, 32, 23, 26; 40/546, 547; 359/70, 69, 49

[56] References Cited

U.S. PATENT DOCUMENTS

| Re. 33,987 | 7/1992 | Suzawa | 359/49 |
|---|---|---|---|
| 2,347,665 | 5/1944 | Christensen et al. | |
| 4,729,068 | 3/1988 | Ohe | 362/31 |
| 4,811,507 | 3/1989 | Blanchet | 40/546 |
| 4,860,171 | 8/1989 | Kojima | 362/31 |
| 4,937,709 | 6/1990 | Yanagi et al. | 362/31 |
| 4,965,950 | 10/1990 | Yamada | 40/546 |
| 4,985,809 | 1/1991 | Matsui et al. | 362/31 |
| 5,134,549 | 7/1992 | Yokoyama | 362/31 |

FOREIGN PATENT DOCUMENTS

| 57-128383 | 8/1982 | Japan. | |
| 60-205576 | 10/1985 | Japan. | |
| 62-902 | 1/1987 | Japan. | |
| 1245220 | 9/1989 | Japan | 359/70 |
| 2-126501 | 5/1990 | Japan. | |

Primary Examiner—William L. Sikes
Assistant Examiner—Ron Trice
Attorney, Agent, or Firm—Wenderoth, Lind & Ponack

[57] ABSTRACT

There is provided a surface luminous source panel comprising an irregular reflection layer carrying on it a large number of irregular reflector specks and arranged on the surface of a transparent substrate. The reflection layer has a parallel pattern section having an area of irregular reflector specks per unit length of the layer which smoothly increases with the distance from a light source along the panel; and a regulating pattern section located close to the light source and partially surrounded by the parallel pattern section. The regulating pattern section has a hill-shaped contour starting from the edge close to the light source and an area of irregular reflector specks per unit length of the layer also smoothly increasing with the distance from the light source but at a rate smaller than that of the parallel pattern section. Such a surface luminous source panel can provide a luminous source with very evenly distributed brightness and therefore find useful applications in, for example, word processors and display stands.

4 Claims, 5 Drawing Sheets

SURFACE LUMINOUS SOURCE PANEL WITH AREAS HAVING DIFFERENT REFLECTOR SPECK DENSITIES

This is a continuation-in-part of U.S. patent application Ser. No. 07/587,763 filed Sep. 26, 1990 and now abandoned.

BACKGROUND OF THE INVENTION

1. Field of Invention

This invention relates to a surface luminous source panel to be used for a surface luminous source apparatus that finds applications in a variety of illuminations including back illuminations using liquid crystal back lights, display stands and display panels.

2. Prior Art

There have been proposed surface luminous source apparatus provided with a light source arranged on an end surface of a surface luminous source panel that can replace conventional luminous source apparatus of the type having a large number of fluorescent light sources arranged on the back side of an irregular reflector panel.

While such known surface luminous source apparatus can be realized in a very thin and compact form, they have the disadvantage of being incapable of providing evenly distributed brightness. In an attempt to eliminate this drawback, Japanese Patent No. 57-128383 proposes an irregular reflection layer formed by white paint and having a reflectivity that smoothly augments with the distance from the surface and Japanese Patent No. 60-205576 discloses a front irregular reflection layer of a transparent substrate formed by white paint to which glass beads are added, while Japanese Patent No. 62-902 teaches a multi-layered structure of surface luminous source panels each provided with an irregular reflection layer.

Since none of these completely eliminate the problem, the inventors of the present invention proposed in Japanese Patent Application No. 63-208670 an irregular reflection layer carrying on it a large number of irregular reflector specks and arranged on a surface of a transparent substrate, wherein the area of the irregular reflector specks of the irregular reflection layer is smoothly increased with the distance from the light source along the layer. The irregular reflector specks are realized in the form of so many dots or strips arranged at a rate of 30 to 65 rows per centimeter by screen printing using a low concentration ink containing solid by 13 to 30 wt % solids in order to produce a low light transmittivity. When an irregular reflection layer according to the above cited invention is used with 8W fluorescent lamps arranged at its opposite end surfaces to form a surface luminous source panel of A4 size, it produces a brightness as high as 2,000 nit.

While a surface luminous source panel such as proposed by the inventor of the present invention and described above can be used for a surface luminous source apparatus having a variety of practical applications, it is still accompanied by the drawback of producing an undesirably highly bright region near the sources of light when it is used as a liquid crystal back light of a portable word processor, computer or television set.

The region showing an undesirably high brightness of such a surface luminous source apparatus generally has a curved contour, which becomes flat or even straight when the irregular reflection layer extends very close to the edges of the transparent substrate.

Although such a surface luminous source panel provides a practically even distribution of brightness, it has a slight unevenness of brightness which can be emphasized to damage the overall effect of the panel particularly when it is used in an apparatus where the evenness of brightness is rigorously required.

It is therefore an object of the present invention to provide a surface luminous source panel which is free from the above problem and ensures a highly even distribution of brightness to meet any rigorous requirements.

SUMMARY OF THE INVENTION

As a result of intensive research efforts by the inventors of the present invention, it was found that the uneven distribution of brightness and generation of a highly bright region of a conventional surface luminous source panel is caused by the fact that the beams of light coming from the light source and incident to the transparent substrate do not necessarily proceed straight but tend to be inclined in an attempt to become parallel to the diagonals of the substrate so that the beams of the incident light are concentrated at the region having a curved contour as described above. It was also determined that a surface luminous source panel having an irregular reflection layer carrying on it irregular reflector specks whose area is smoothly increased with the distance from the light source cannot effectively compensate the uneven distribution of brightness due to the concentrated incident light because the irregular reflector specks of the irregular reflection layer are arranged in parallel rows along the lateral edges of the substrate to form a parallel pattern so that the area of the irregular reflector specks is smoothly increased with the distance from the lateral edge where the light source is disposed. It was further found that, when a fluorescent lamp is used for the light source, the reduced brightness at or around the two oppositely disposed bases of the lamp can emphasize the uneven brightness distribution.

It was also found that a surface luminous source panel provided with an irregular reflection layer which extends very close to the edges of the transparent substrate is directly influenced by the light source and hence the irregular reflection layer cannot satisfactorily exert its intended function if the irregular reflector specks are arranged in parallel rows to form a parallel pattern.

On the basis of these findings, the inventors of the present invention determined that the above and other objects of the present invention could be achieved by providing a surface luminous source panel comprising an irregular reflection layer carrying on it a large number of irregular reflector specks and arranged on the surface of a transparent substrate, wherein the reflection layer comprises a parallel pattern section having an area of irregular reflector specks per unit length of the layer smoothly increasing with the distance from a light source along the panel, and a regulating pattern section located close to the light source and partially surrounded by the parallel pattern section. The regulating pattern section has a hill-shaped contour starting from the edge close to the light source and an area of irregular reflector specks per unit length of the layer also smoothly increasing with the distance from the light source but at a rate smaller than that of the parallel pattern section. According to a second aspect of the invention, there is provided a surface luminous source panel comprising an irregular reflection layer carrying on it a large number of irregular reflector specks and arranged on the surface of a transparent substrate, the irregular reflector layer extending close to the lateral edges of the substrate. The reflection layer has a parallel pattern section having an area of irregular reflector specks per unit length of the layer smoothly increasing with the distance from a light source along the panel, and a regulating pattern section located close to the light source and partially surrounded by the parallel pattern section. The regulating pattern section has a flat or slightly hill-shaped contour starting from the edge close to the light source, and an area of irregular reflector specks per unit length of the layer also smoothly increasing with the distance from the light source but at a rate smaller than that of the parallel pattern section.

With a surface luminous source panel according to the invention, since the irregular reflection layer at the part of the panel where the incident light shows a high concentration of beams or the part which is directly influenced by the incident light has a significantly reduced area of irregular reflector specks per unit length of the reflection layer, the irregular reflection of light at the regulating pattern section ensures sufficient propagation of light toward the lateral edge opposite to the light source and, at the same time, a satisfactorily even brightness. Thus, the radiation of light in the regulating pattern section can be suppressed, thereby making it visually indiscernible from the parallel pattern section on the irregular reflection layer.

Now the present invention will be described in greater detail by referring to the accompanying drawings that illustrate preferred embodiments of the invention.

DETAILED DESCRIPTION OF THE INVENTION

Figure 1:
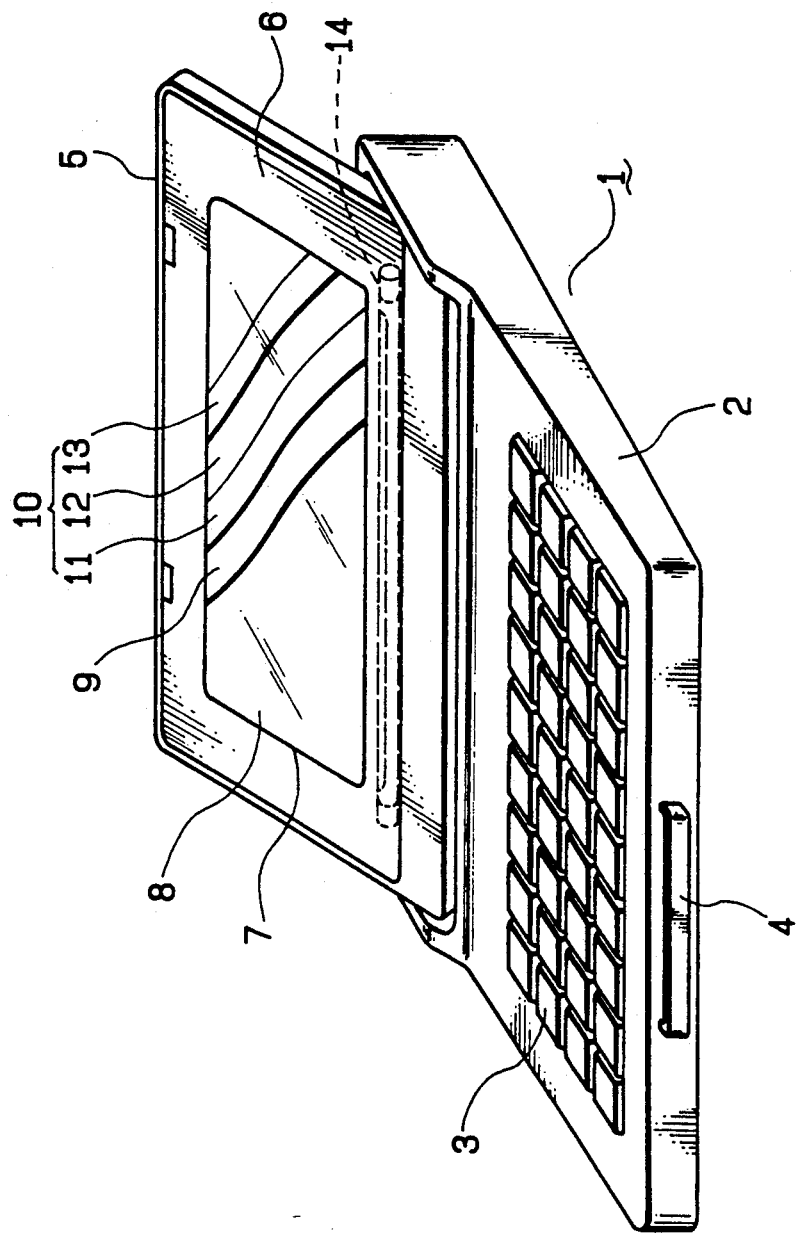
FIG. 1 is a perspective view of a word processor comprising an embodiment of the surface luminous source panel of the invention.
Figure 2:
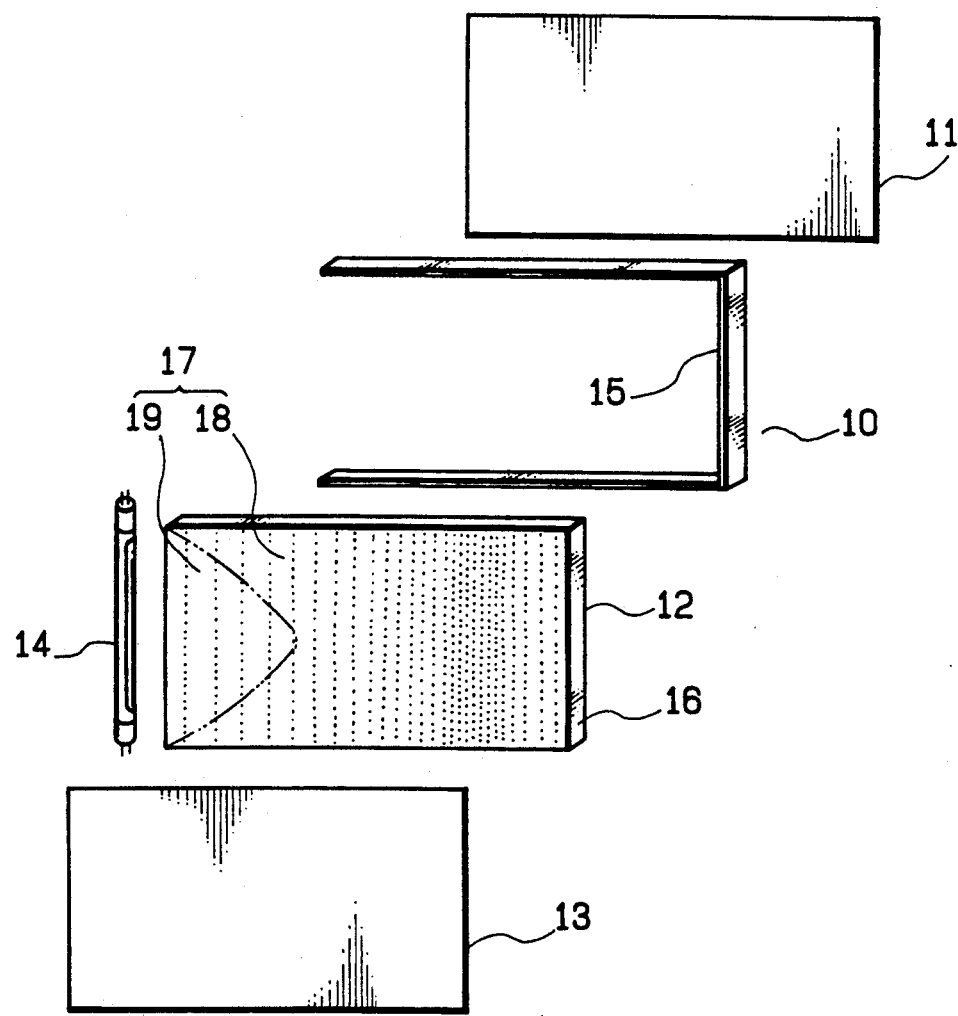
FIG. 2 is a exploded perspective view of the major components of the word processor of FIG. 1.

Referring first to FIG. 1, reference numeral 1 generally denotes a word processor comprising a main body that carries a keyboard 3 on it and an upright display section 5 that can be folded over the main body 5 for ease of storage and transportation.

The foldable display section 5 is realized in the form of a thin and wide board having a thickness of approximately 1 cm (or a thickness equal to or less than a third of that of existing similar display devices which are normally approximately 3 cm thick). The display section 5 carries a display surface 7 made of a liquid crystal panel 9 which is protected by a transparent protective panel 8.

On the rear side of the liquid crystal panel 9 of the foldable display section 5, there is arranged a surface luminous source apparatus 10.

The surface luminous source apparatus 10 comprises a transparent irregular reflection sheet 11 made of a milky white polyester film, a surface luminous source panel 12 and a reflection back sheet 13 also made of a milky white polyester film arranged in a layered structure as viewed from a lateral side. The apparatus 10 also comprises a light source 14 which is a fluorescent lamp arranged at the bottom of the apparatus, and an end reflector section 15 made of a white tape and surrounding the three edges of the surface luminous source panel 12 other than the edge where the light source 14 is arranged.

The fluorescent lamp light source 14 in this embodiment is realized in the form of a so-called cylindrical aperture tube having a longitudinal transmissive slit area arranged vis-a-vis the surface luminous source panel 12. The remaining surface area of the lamp is covered by a reflective material at the inside or outside thereof in order to maximize the quantity of light incident to the surface luminous source panel.

The surface luminous source panel 12 is prepared by using a transparent substrate 16 of transparent acrylic resin with lateral and longitudinal dimensions of 130×240 mm and a thickness of 6 mm, whose rear surface is coated with an irregular reflection layer 17 provided with a large number of irregular reflector dots or specks.

The irregular reflection layer 17 comprises a parallel pattern section 18 and a regulating pattern section 19, of which the parallel pattern section 18 covers all of the irregular reflection layer 17 except the portion occupied by the regulating pattern section 19 and is so formed that the area of irregular reflector specks per unit length of the irregular reflection layer is smoothly increased with the distance from the light source along the surface of the layer 17. In this embodiment, the smooth increase of area is maximized at a location slightly displaced toward the upper end reflector section 15, or the end opposite to the light source, from the middle of the surface luminous source panel 12 between the light source 14 and the upper end reflector section 15. This particular arrangement is utilized to ensure an even brightness for the parallel pattern section 18 by preventing the area near the end reflector section 15 which is most remote from the light source from becoming too bright due to the light reflected by the end reflector section 15.

On the other hand, the regulating pattern section 19 is so formed that it has a hill-like contour extending from the bottom edge of the irregular reflection layer 17 facing the light source 14 and surrounded by the parallel pattern section 18, in order to reduce the rate of increase of the area of irregular reflector specks per unit length of the irregular reflection layer as a function of the distance from the light source.

The reduction in the rate of increase of the area of irregular reflector specks in the regulating pattern section 19 as compared with the rate of increase in the parallel pattern section is preferably made by several to 15%. Nevertheless, the area of irregular reflector specks in the regulating pattern section should be smoothly increased as a function of the distance from the light source so that the regulating pattern section 19 may smoothly merge into the parallel pattern section 18 at the boundary between the two sections 18 and 19. If so arranged, the difference of tone between the regulating pattern section 19 and the parallel pattern section at the boundary zone may be practically visually undiscernible from the outside of the surface luminous source panel 12.

While an irregular reflection layer 17 comprising a parallel pattern section 18 and a regulating pattern section as described above can be prepared by means of a screen printing technique as disclosed in Japanese Patent Application No. 63-208670 by the inventors of the present invention, or by applying a white printed film or employing a known shock blast technique, it is most preferably prepared either by means of the screen printing technique by applying a film, since both techniques ensure high precision and involve a simple but reliable process as described below.

When, for example, an irregular reflection layer 17 is formed by screen printing, a parallel pattern section 18 and a regulating pattern section 19 can be produced on a second negative film, for which a printing PVC film may be used, by exposing it to ultra-violet light for projection of an irregular reflection pattern to be used for the irregular reflection layer 17.

Figure 3:
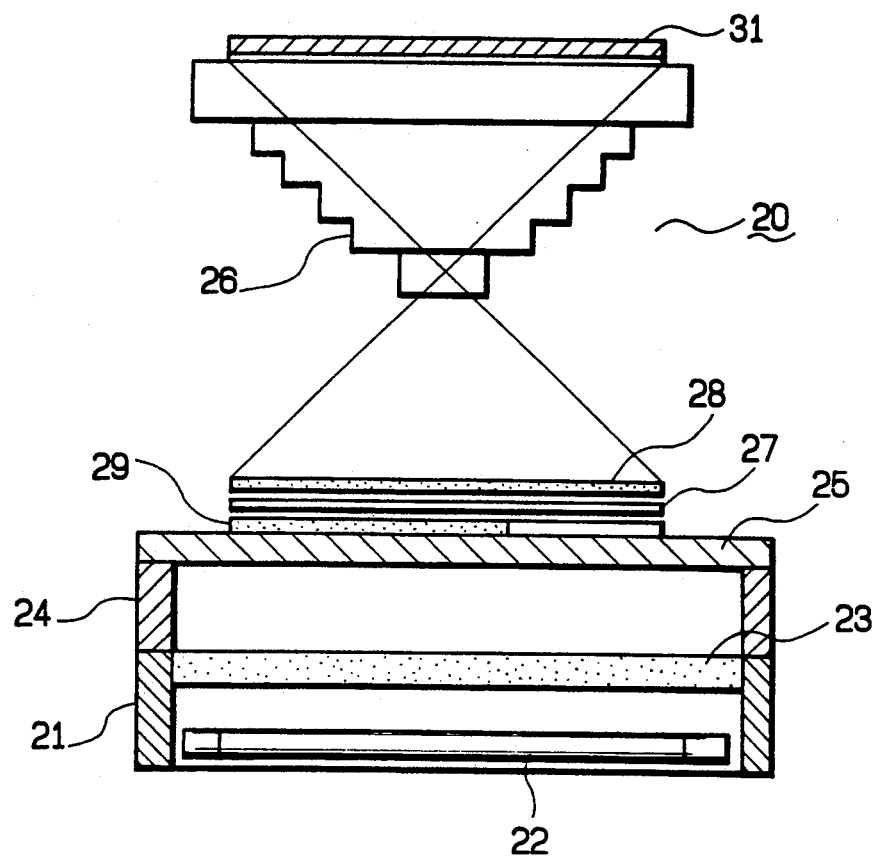
FIG. 3 is a front view of an image photographing apparatus to be used for the present invention.

FIG. 3 of the accompanying drawings illustrates a photographing apparatus 20 for preparation of a second negative film 31. In FIG. 3, reference numeral 21 denotes a light box, 22 an illumination lamp, 23 a milky white glass panel for irregular reflection arranged on the upper side of the light box 21, 24 a stand frame carrying on its upper surface a transparent glass panel 25, and 26 a camera.

For shooting or photographing an image, using the above described photographing arrangement and a second negative film 31, an original film 27 having a dotted pattern thereon and available from Retra Japan, and a square diffusion sheet 28 made of milky white polyester film, are first placed in layers.

Figure 4:
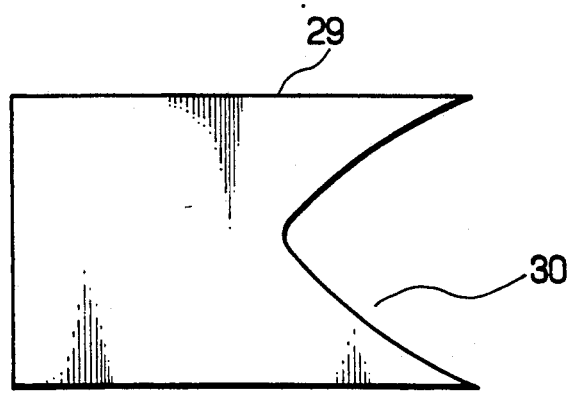
FIG. 4 is a plan view of a diffusion sheet used in the embodiment of FIG. 3.
Figure 5:
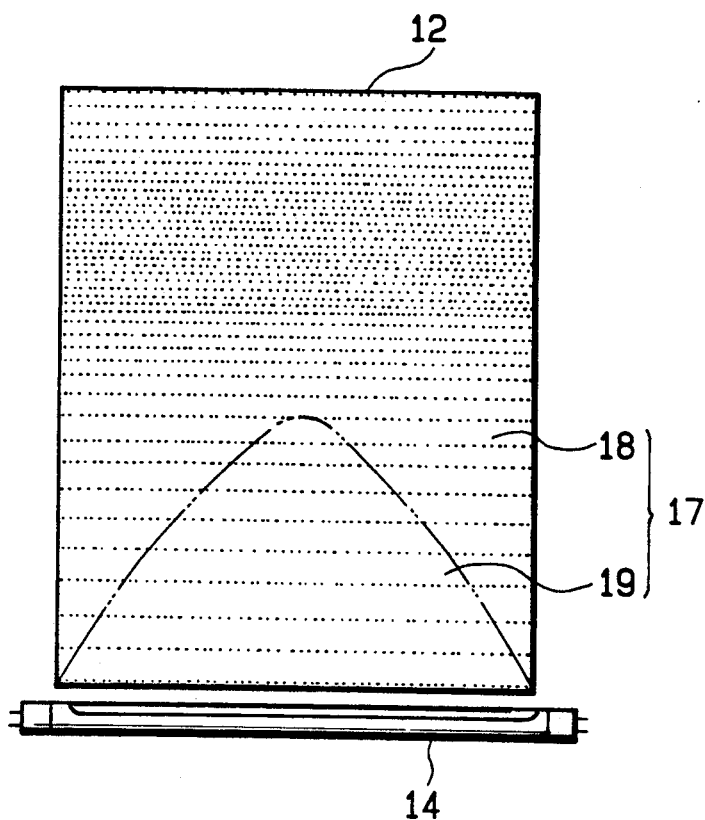
FIGS. 5 and 6 are plan views of the surface luminous source panels of two different embodiments.

Then, another diffusion sheet 29 also made of milky white polyester film and provided with a cut-off area 30 that corresponds to the shape of the regulating pattern section 19, as illustrated in FIG. 4, is additionally placed under the original film 27 between the transparent glass panel 25 and the original film 27.

As the parallel pattern on the original film 27 is copied onto the second negative film by way of the diffusion sheet 29, the light beams that hit the cut-off area 30 directly reach the original film 27, while the beams that hit the remaining masked area reach the negative film only after passing through the diffusion sheet 29 such that they have a somewhat reduced light intensity before the patterned image is recorded on the second negative film 31.

Since the intensity of the light beams passing through the cut-off area 30 is higher than that of the light beams from the masked area, the former beams proceed as if they go behind the dots of the original film 27 to raise the rate of exposure to light of each dot and therefore reduce its area in the regulating pattern area as it is recorded on the second negative film 31 so that both a parallel pattern section 18 and a regulating pattern section 19 are formed on the second negative film by a single photographic operation.

Since the diffusion sheet 28 on the original film 27 evenly diffuses the illuminating light while maintaining the uneven distribution of intensity of the light, the border line of the cut-off area 30 of the lower diffusion sheet 29 is blurred so that the parallel pattern section 18 smoothly moves to the regulating pattern section 19.

If, on the other hand, the cut-off area of the lower diffusion sheet 29 is replaced by a transparent sheet, an intermediate light-colored masking section may be placed between the cut-off or transparent area and the masked area in order to enhance the smooth transition from the parallel pattern section 18 to the regulating pattern section 19 and vice versa.

The step of screen printing for the exposed PVA second negative film 31 can be conducted on a transparent substrate 16 by a known method using an ink disclosed in the Japanese Patent Application No. 63-208670.

A surface luminous source apparatus 10 comprising the first embodiment of the surface luminous source panel 12 of the invention can effectively eliminate any conspicuous changes of brightness due to concentration of incident light as observed in conventional similar apparatus and therefore provides an even and bright back illumination for a liquid crystal panel 9 illuminated by the incident light from the light source 14.

Figure 6:
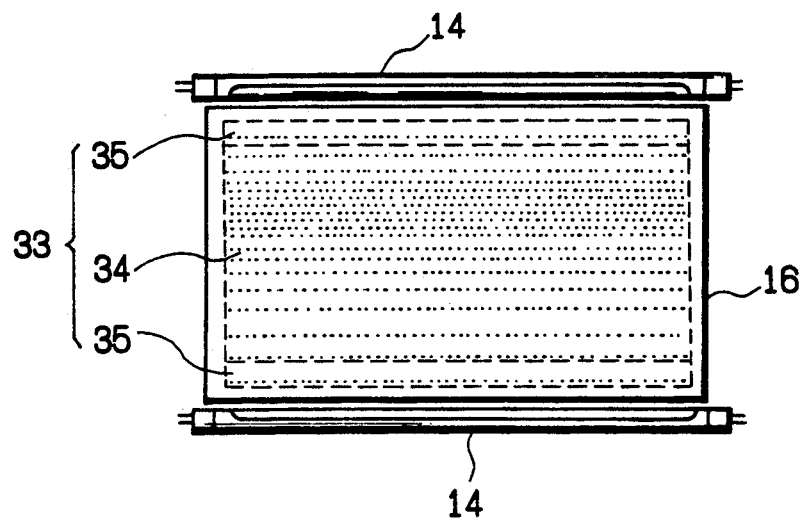
Figure 7:
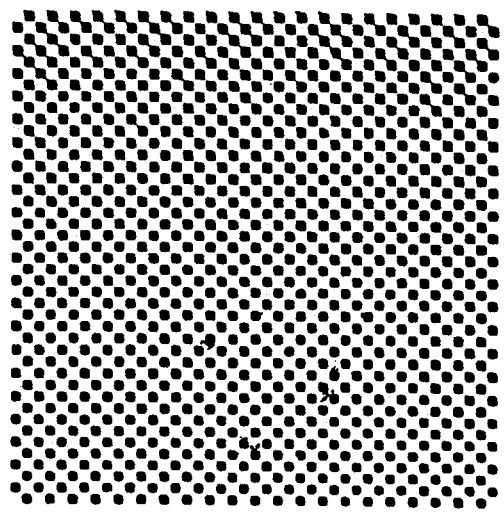
FIG. 7 is an enlarged partial view of the embodiment of FIG. 1 showing some irregular reflector specks of a parallel pattern section.
Figure 8:
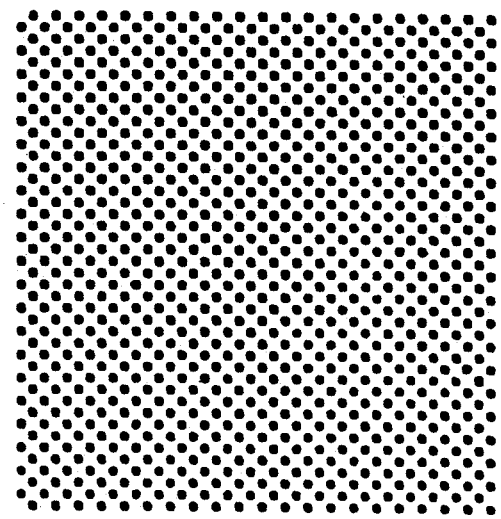
FIG. 8 is an enlarged partial view of the embodiment of FIG. 1 showing some irregular reflector specks of a regulating pattern section.

FIG. 6 of the accompanying drawings shows an embodiment of the surface luminous source panel 32 according to a second aspect of the invention. Like the first embodiment as described above, this embodiment is designed for a back light of a liquid crystal display device, although it has a pair of light sources 14 arranged at the opposite ends of the panel.

As in the case of the first embodiment, an irregular reflection layer 33 is formed by means of the screen printing technique over all of a transparent substrate 16 except at narrow margins, thereof which extend along the edges of the latter and hence close to the light sources 14. The irregular reflection layer 33 comprises a parallel pattern section 34 having dots arranged on it whose area per unit length of the layer gradually increases with the distance from the closer of the two light sources 14 along the surface of the panel, the largest area being found at the middle between the two light sources, and a pair of regulating pattern sections 35 arranged near and substantially in parallel with the respective lateral edges and having a reduced area of dots per unit length of the panel as compared with that of the parallel pattern section.

The regulating pattern sections 35 are formed by using a narrow diffusion sheet to mask only the middle portion of the a second negative film so that both the lateral portions are subjected to direct exposure of light. Otherwise, the surface luminous source panel 32 is prepared in a manner identical to the manner in which the first embodiment is realized and thus further explanation will be omitted here.

This embodiment of the surface luminous source panel 32 of the invention is also free from any sudden changes of brightness that can normally be found near the edges when an irregular reflection layer extends close to the edges of the panel and, therefore, provides an even and bright back illumination for a liquid crystal panel.

While the above described embodiments are realized by using one or more diffusion sheets, an irregular reflection layer comprising a parallel pattern section and a regulating pattern section of a surface luminous source panel according to the invention may alternatively be designed and modified by computer programming using a computer so that the programmed pattern can be substantiated when the original film is actually produced. In such a case, it may be needless to say, lower diffusion sheets as described above are not required.

While a surface luminous source panel according to the invention is most suitably used for a surface luminous source apparatus which must be of high precision and provide evenness of liquid crystal back light, it may also be used for a surface luminous source apparatus for display applications using positive films and a back light or for an interior or exterior installation to be used as a back light source.

With such applications, two or more surface luminous source panels may be used in a multi-layered structure with irregular reflection/transmission films disposed therebetween. A surface luminous source panel according to the invention can safely accommodate such needs. Moreover, a surface luminous source panel according to the invention can be used as a source of front illumination as well as that of back illumination. In addition, a surface luminous source panel according to the invention can be realized with a curved surface.

As is apparent from the above description, a surface luminous source panel according to the invention is not limited to the cited embodiments and it may, along with its parallel pattern section and regulating pattern section(s), be modified in terms of dimensions, number, shape, configuration and application within the scope and spirit of the invention.

A surface luminous source panel according to the invention is completely free from any undesirably enhanced brightness of a surface luminous source apparatus near the light source(s) and ensures a very evenly distributed brightness so that it can meet rigorous requirements of a back light for a liquid crystal display apparatus.

What is claimed is:

1. A surface luminous source panel for use in a surface luminous source apparatus having a first light source and a second light source, said surface luminous source panel comprising:

a transparent substrate having opposing faces and a plurality of peripheral edges, a first of said peripheral edges being disposed at a first end of said transparent substrate and being positioned adjacent said first light source, and a second of said peripheral edges being disposed at a second end of said transparent substrate opposite said first end thereof and being positioned adjacent said second light source; and an irregular reflection layer comprising irregular reflector specks arranged on one of said opposing faces of said transparent substrate, said irregular reflection layer including a parallel pattern section in which said irregular reflector specks occupy an area per unit length of said irregular reflection layer which smoothly increases at a first rate with a distance from said first peripheral edge in an area between said second peripheral edge and a center location midway between said first and second peripheral edges and with a distance from said second peripheral edge in an area between said second peripheral edge and said center location, and first and second regulating pattern sections in which said irregular reflector specks occupy an area per unit length of said irregular reflection layer which smoothly increases at a second rate with a distance from said first and second peripheral edges, respectively, said first rate being greater than said second rate; and wherein said one of said opposing faces of said transparent substrate includes first and second narrow margin portions extending adjacent and parallel to said first and second peripheral edges, respectively, said first and second narrow margin portions being free of said irregular reflector specks.

2. A surface luminous source panel as recited in claim 1, wherein
said first and second regulating pattern sections are disposed adjacent said first and second narrow margin portions, respectively.

3. A surface luminous source panel as recited in claim 2, wherein
said first regulating pattern section is shaped such that it has two parallel borders, both of which are parallel with said first peripheral edge; and
said second regulating pattern section is shaped such that it has two parallel borders, both of which are parallel with said second peripheral edge.

4. A surface luminous source panel for use in a surface luminous source apparatus having a first light source and a second light source, said surface luminous source panel comprising:

a transparent substrate having opposing faces and plurality of peripheral edges, a first of said peripheral edge being disposed at a first end of said transparent substrate and being positioned adjacent said first light source, and a second of said peripheral edges being disposed at a second end of said transparent substrate opposite said first end thereof and being positioned adjacent said second light source; and an irregular reflection layer comprising irregular reflector specks arranged on one of said opposing faces of said transparent substrate, said irregular reflection layer including a parallel pattern section in which said irregular reflection specks occupy in area per unit length of said irregular reflection layer which smoothly increases at a first rate with a distance from said first peripheral edge in area between said second peripheral edge and a center location midway between said first and second peripheral edges and with a distance from said second peripheral edge in area between said second peripheral edge said center location, and first and second regulating pattern sections in which said irregular reflector specks occupy an area per unit length of said irregular reflection layer which smoothly increases at a second rate with a distance from said first and second peripheral edges, respectively, said first rate being greater than said second rate; and wherein said one of said opposing faces of said transparent substrate includes a plurality of narrow margin portions extending adjacent and parallel to said plurality of peripheral edges, respectively, said narrow margin portions being free of said irregular reflection specks.

* * * * *